United States Patent [19]

Baba

[11] 4,449,420

[45] May 22, 1984

[54] STEERING APPARATUS

[75] Inventor: Masanao Baba, Takarazuka, Japan

[73] Assignee: Nippon Cable System Inc., Hyogo, Japan

[21] Appl. No.: 330,475

[22] Filed: Dec. 14, 1981

[30] Foreign Application Priority Data

Dec. 15, 1980 [JP] Japan .............................. 55-177629

[51] Int. Cl.³ .............................................. F16C 1/10
[52] U.S. Cl. .................................... 74/501 R; 74/506; 74/480 B; 74/89.2; 74/96; 114/144 R; 280/774
[58] Field of Search ................... 74/501 R, 501.5, 502, 74/505, 506, 496, 480, 480 B, 785, 788, 89.2, 89.21, 89.22, 82; 114/144 R, 160, 161; 280/774; 242/100.1

[56] References Cited

U.S. PATENT DOCUMENTS

| | | | |
|---|---|---|---|
| 843,558 | 2/1907 | Brownim | 74/785 |
| 2,321,780 | 6/1943 | Tonover | 74/501 |
| 3,111,042 | 11/1963 | Hoover | 74/501 |
| 3,203,270 | 8/1965 | Booth | 74/506 |
| 3,206,998 | 9/1965 | Matz, Jr. et al. | 74/501 |
| 3,208,300 | 9/1965 | Morse | 74/501 |
| 3,503,275 | 3/1970 | Morse | 74/501 |
| 3,669,466 | 6/1972 | Spence | 74/469 |
| 3,747,428 | 7/1973 | Waner et al. | 74/469 |
| 3,954,022 | 5/1976 | Hemens | 74/505 |
| 4,014,281 | 3/1977 | Hemens | 74/505 |
| 4,225,148 | 9/1980 | Anderson | 74/501 R |

Primary Examiner—Lawrence J. Staab
Assistant Examiner—Anthony W. Raskob, Jr.
Attorney, Agent, or Firm—Armstrong, Nikaido, Marmelstein & Kubovcik

[57] ABSTRACT

A steering apparatus comprising an operating unit having an operating pulley rotated by a steering wheel, a steering unit having a steering pulley rotated by two inner cables so as to steer a rudder means through a steering screw rotated by the steering pulley and a steering pipe moved by the steering screw, and substantially two pull cables having the two inner cables connecting the operating unit and the steering unit, whereby the rudder is operated by the steering wheel without the influence of waves, and further the steering apparatus can be constructed by combination of the plural operating units and the plural steering units.

7 Claims, 8 Drawing Figures

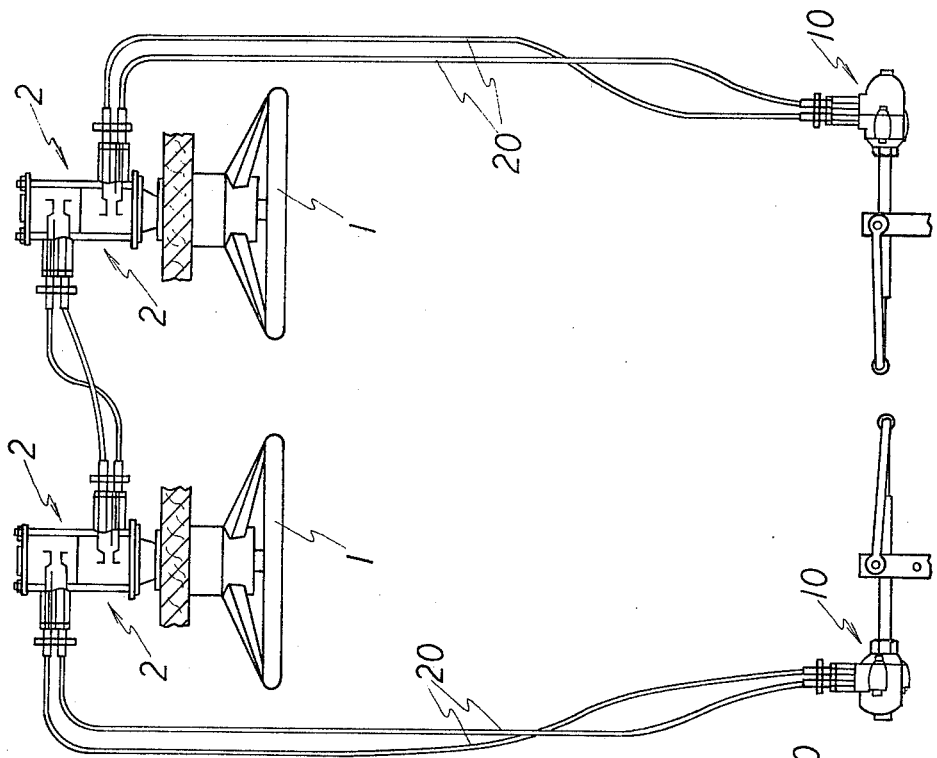
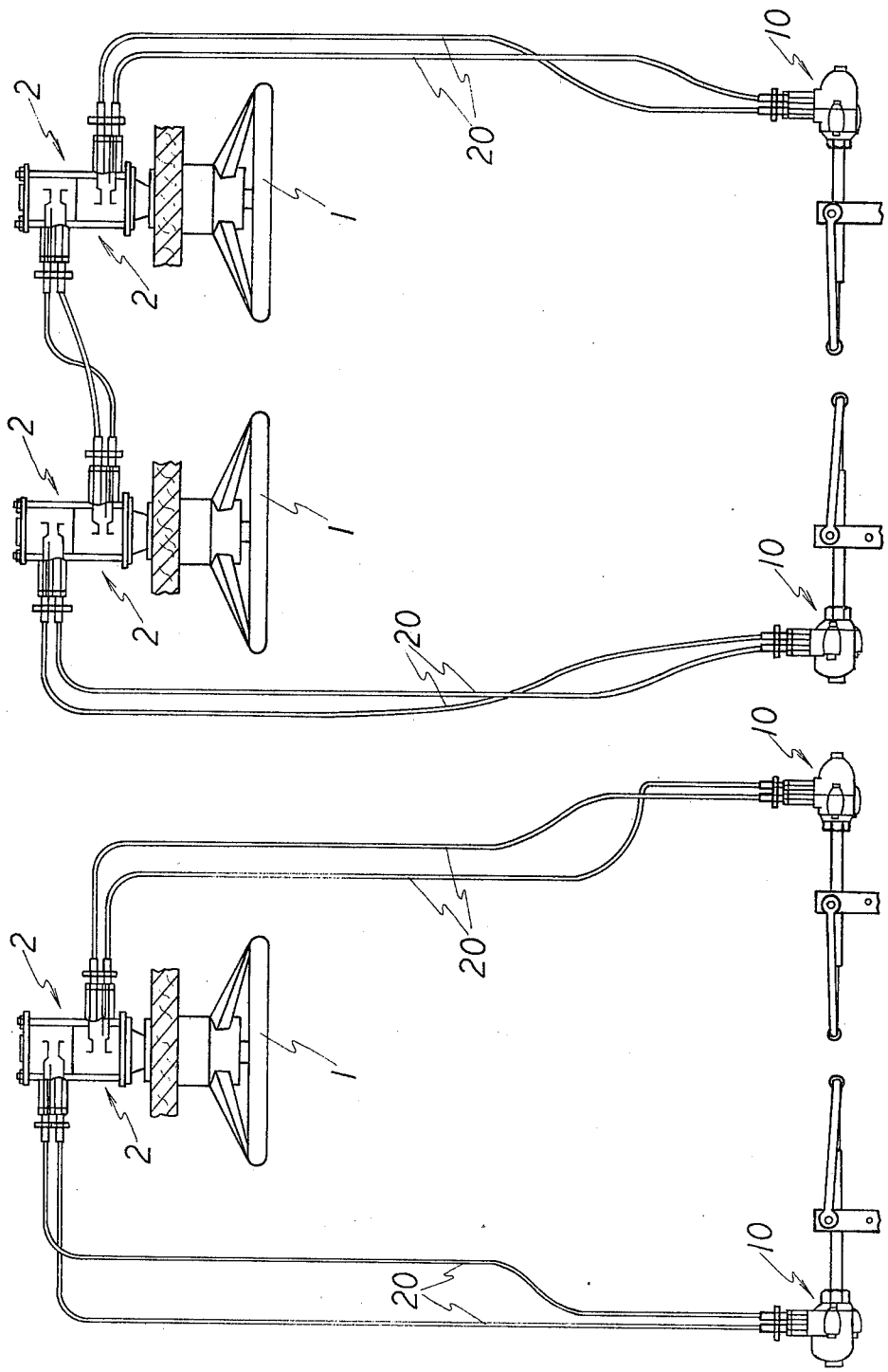
FIG. 7
FIG. 6

STEERING APPARATUS

BACKGROUND OF THE INVENTION

The present invention relates to a steering apparatus for remote control of a rudder means by using substantially two pull control cables.

In this specification, a pull control cable (hereinafter referred to as "cable") essentially consists of a conduit, e.g. a tube of a spiral tube made of at least one metal wire covered by synthetic resin on the outer surface thereof, and an inner cable, e.g. stranded metal wires, which are slidably inserted into the conduit.

Generally, a small-sized heat is equiped with a screw-type inboard or outboard engine which functions also as a rudder due to turn of the engine, or with a jet-type engine which functions also as a rudder due to turn of the jet nozzle. In the boat which has the inboard or outboard engine, the rotation of the steering wheel is transmitted through a push-pull cable which has an inner cable capable of enduring against the push-pull load. However, the push-pull cable generates some play in the longitudinal direction due to the clearance between the inner surface of the conduit and the outer surface of the push-pull inner cable inserted slidably into the conduit. Therefore, there is a defect that the direction of travel of the boat is not stable, due to the shock of the waves, or the like given to the rudder means in navigation.

The boat which has the later engine also has a defect that the direction of travel of the boat is not stable, because the jet nozzle swings to left and right in proportion of the degree of play, caused by the shock of the waves, or the like. Furthermore, the conventional rudder means which is independent of the propulsion device also has defect that the direction of travel of the boat is not stable due to play of the push-pull inner cable.

In order to avoid the above defects, an apparatus for operating the rudder means by winding of substantially two pull cables is proposed. However, in such an apparatus, the strong shock of the waves is transmitted directly to the inner cable, and reaches in the steering wheel. Therefore, the feeling of the steering is not comfortable, and the elongation of the inner cable which causes backlash so that the boat moves in a zigzag direction is generated in the relatively short term. As a result, the tension of the inner cable must be adjusted frequently.

The steering apparatus disclosed in U.S. Pat. No. 3,747,428 has two pulleys provided to the operating side and the working side, respectively, on which the inner cable is wound. In such an apparatus, the inner cable is wound on and off in response to the operation, and therefore the position of winding the inner cable on the pulley is shifted according to the amount of winding of the inner cable. As a result, the inner cable portion between the fixed position of the conduit and the pulley, inner is bent sharply resulting is breakdown. Therefore, the distance of the fixed position of the conduit from the pulley is necessarily large, and it is not avoidable that the apparatus becomes large.

All of the steering apparatuses mentioned above are somewhat dangerous and troublesome in use, because the shock force of waves added to the rudder means sometimes rotates the steering wheel rapidly.

OBJECT OF THE INVENTION

The main object of the present invention is to provide a steering apparatus which is smaller in comparison with the steering apparatuses as mentioned above, which can protect suitably the elongation of the inner cable by employing a mechanism which prevents the direct transmission of the strong shock of waves to the inner cable, and in which the elongation of the inner cable can be adjusted easily by an adjusting member provided at the end of cable, whereby the steering apparatus can be prevented from causing zigzag movement of the boat, and can be operated easily and safely.

Another object of the invention is to provide a steering apparatus in which at least one steering unit can be operated by each steering wheel of a plurality of operating units provided to the various positions.

Other objects and advantages will be apparent from the following descriptions and drawings.

BRIEF DESCRIPTION OF THE DRAWINGS

FIGS. 6 to 8 are plan views showing other embodiments of the arrangement of the steering apparatus of the invention, respectively.

DETAILED EXPLANATION OF THE INVENTION

Figure 1:
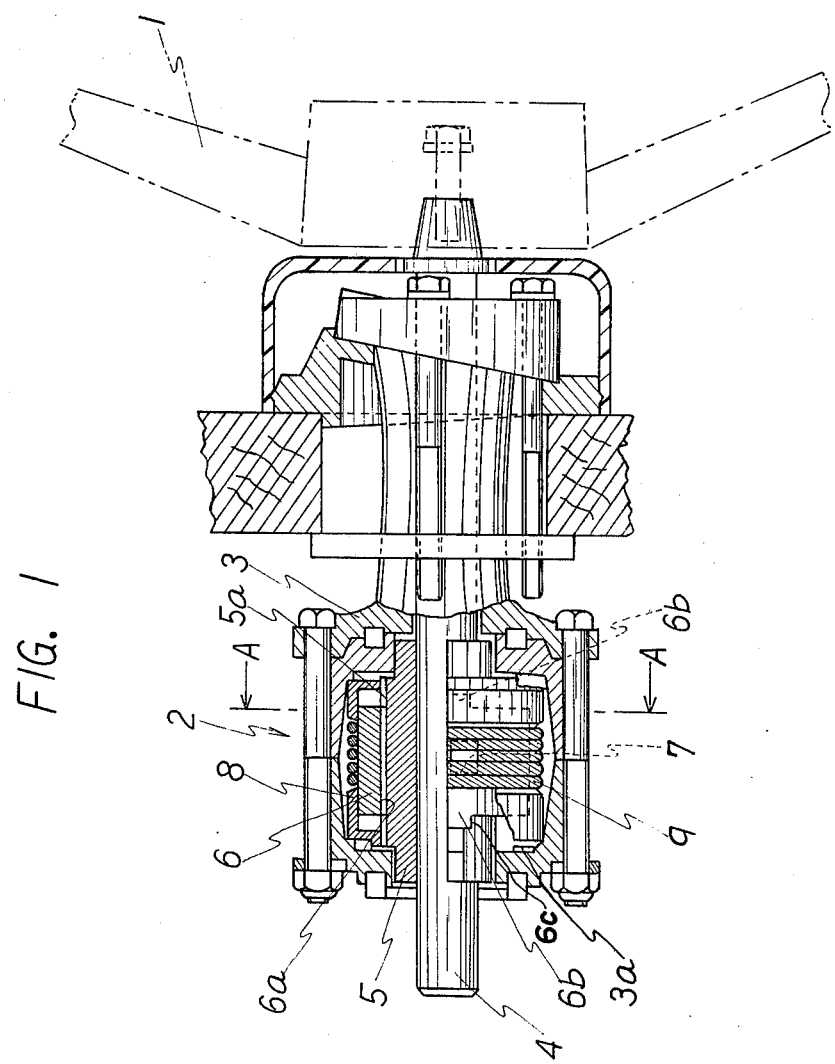
FIG. 1 is a sectional view showing an embodiment of an operating unit in a steering apparatus of the invention.
Figure 2:
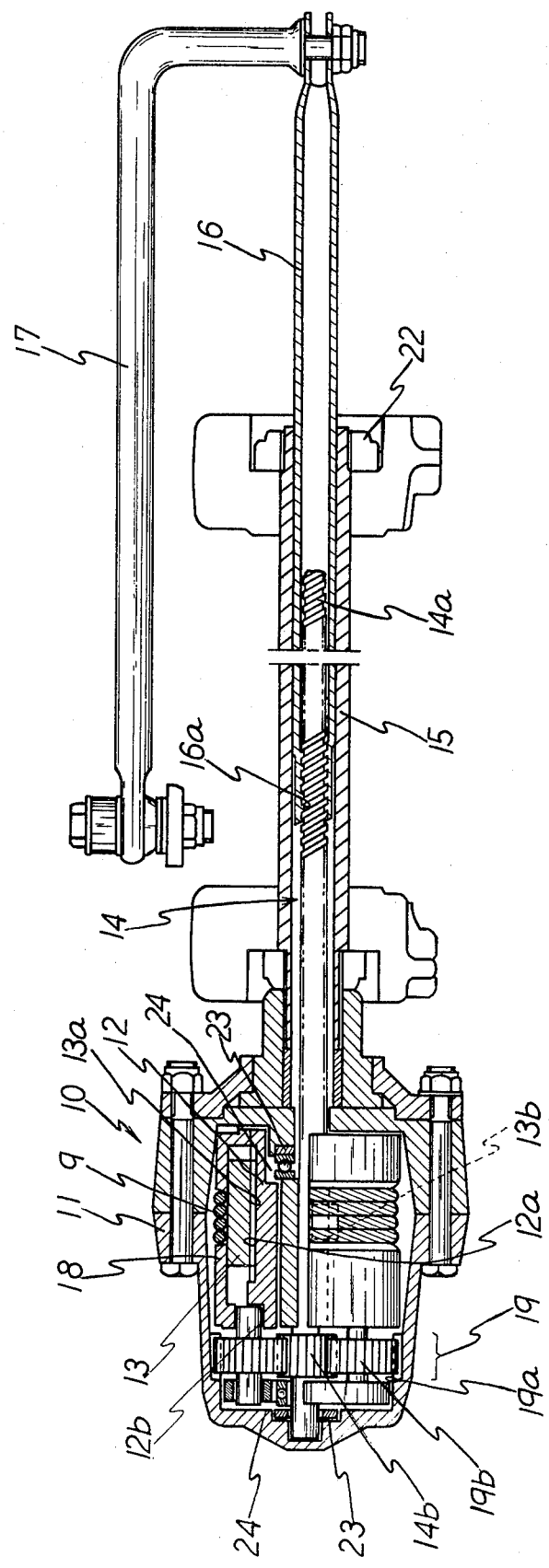
FIG. 2 is a sectional view showing an embodiment of a steering unit is a steering apparatus of the invention.
Figure 3:
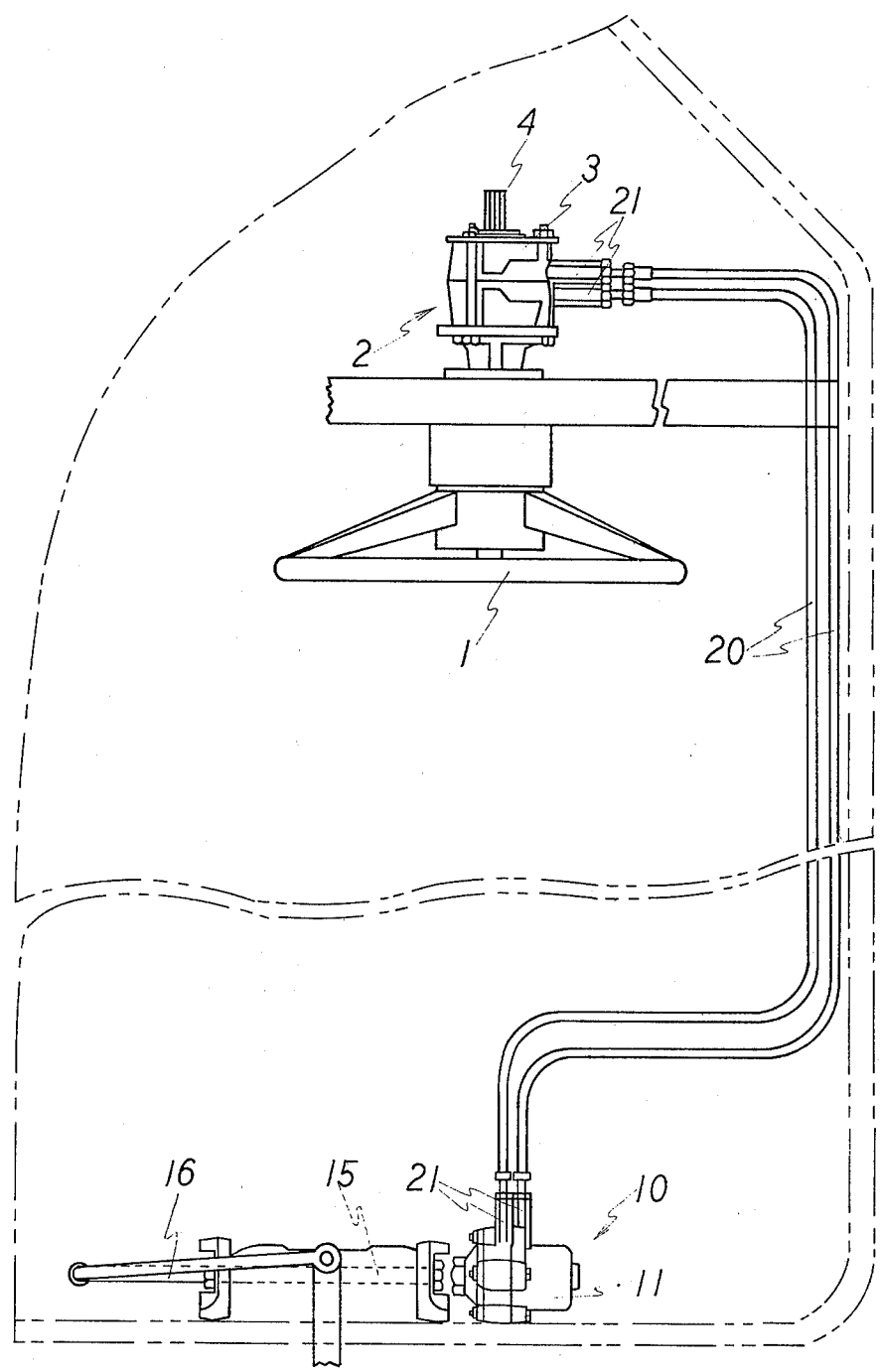
FIG. 3 is a plan view showing an embodiment of an arrangement of a steering apparatus of the invention.

In FIGS. 1 to 8, indicated as 1 is a steering wheel, and 2 is an operating unit. A driving shaft 4 is supported rotatably to a casing 3 which is a body member of the operating unit. The steering wheel 1 is secured to one end of the driving shaft. An operating main shaft 5 is arranged on the outer surface of the other end of the driving shaft 4 so as to be rotatable with the driving shaft 4. A spline 5a is provided to the outer surface of said operating main shaft 5. An operating pulley 6 which is provided with a spline 6a engageable with the spline 5a is arranged on the surface of the operating main shaft 5 so as to be axially movable and rotatable with the driving shaft. At a suitable position of the surface of the operating pully 6, an engaging hole 7 is perforated to engage with the engaging member fixed to the top end of the inner cable 9. Furthermore, stoppers 6b projecting axially are provided in a certain areas of the both side surfaces of said operating pulley 6. Cable guides 8, which cover a certain area of the both ends of the outer surface of the operating pulley 6, are provided on the outer surface of the main operating shaft. The cable guides 8 can guide substantially two inner cables 9 wound round the outer surface of the operating pulley 6 several times to be wound up compactly by the operation whereby the operating pulley can move smoothly in the axial direction. Moreover, a plurality of operating units may be axially connected.

10 is a steering unit. A working shaft 12 is supported by a working-side casing 11 in the steering unit. The working shaft is provided with some spline 12a on the outer surface, and a working pulley 13 provided with the spline 13a engageable with said spline 12a at the inner surface thereof is inserted into the outer surface of the working shaft 12 so as to be axially movable and rotatable together with the working shaft 12. At a suitable position of the surface of the working pulley 13, an engaging hole 13b is perforated so as to engage with the engaging member fixed to the top end of the inner cable 9.

The inner cable 9 is wound round a certain region of the outer surface of the working pulley 13 several times. 14 is a steering screw which is supported rotatably by bearings 24 to the working-side casing 11. Buffers 23 are provided between bearings 24 and casing 11. A male screw 14a is provided at one end portion of the steering screw, and a center gear 14b is secured to the other end of the steering screw. The steering screw 14 is covered by a guide pipe 15 having a suitable length, and the end of the guide pipe is secured to the working-side casing 11. And, a steering pipe 16 is inserted into the guide pipe 15 so as to be movable axially, and the male screw 14a of the steering screw 14 is screwed into the female screw 16a provided at the inner surface of one end of the steering pipe 16, and the other end is connected rotatably with a steering rod 17. Members indicated as 20 are conduits of the cable, and at the end of each conduit, at least one tension-adjusting member 21 for the inner cable is provided. One end of each conduit is secured to the operating unit through the tension-adjusting member, and the other end of each conduit is secured to the steering unit. As a result, both units are joined by the conduits. The inner cables 9 are inserted slidably into the conduits. 19 is an overdrive gear comprising bearings 12b for planetary gears provided to the working shaft 12, planetary gears 19b supported by the bearings 12b and an internal gear 19a fixed to the working-side casing 11. The planetary gears 19b are meshed with the center gear 14b and with the fixed internal gear 19a.

Figure 4:
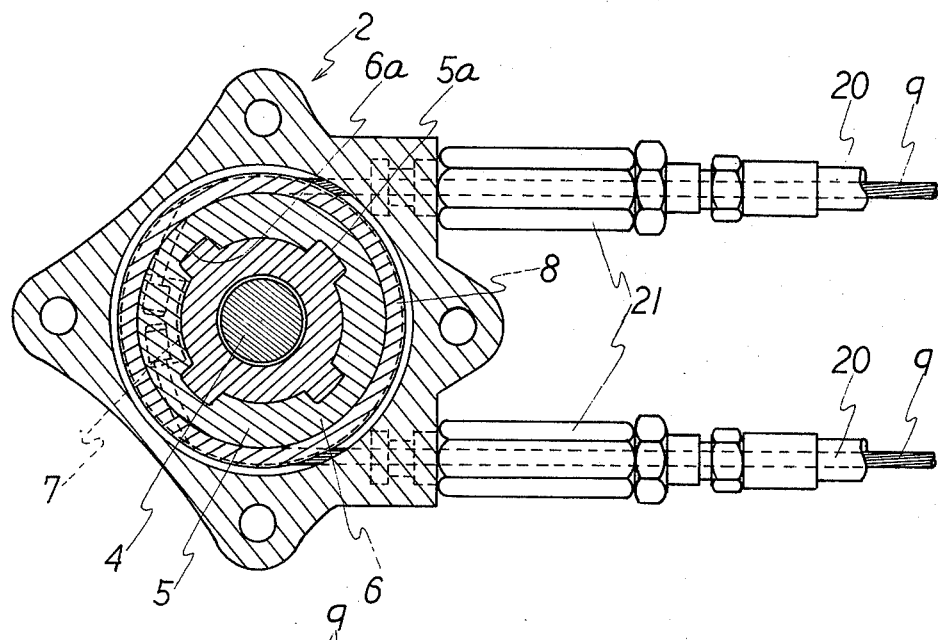
FIG. 4 is a sectional view taken along the line A—A of the FIG. 1.
Figure 5:
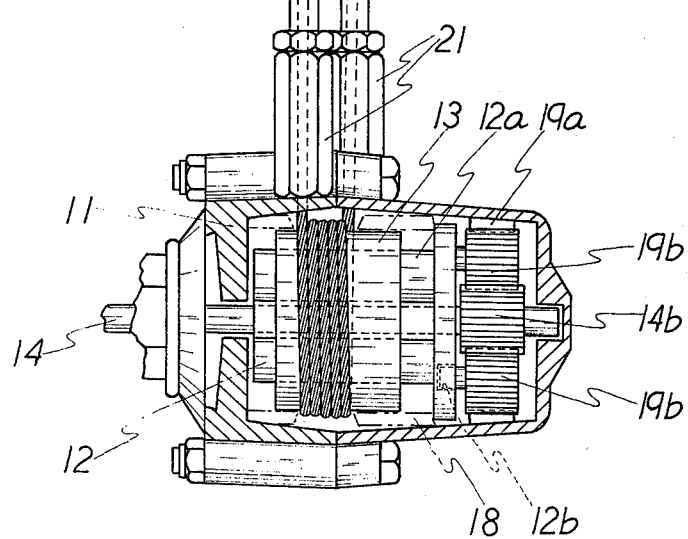
FIG. 5 is a plan view partly broken away of the steering unit shown in FIG. 2.

The end portions of the inner cable 9 are wound round the operating pulley 6 and the working pulley 13 (hereinafter referred to as "both pulleys" generically) as shown in FIGS. 4 and 5.

Hereinafter, the functions and advantages of the invention will be described.

When the steering wheel 1 is rotated rightward or leftward, the operating pulley 6 is rotated through the operating main shaft 5. And, the steering pulley 13 in the steering unit is also rotated through the inner cable 9. Simultaneously, the working shaft 12 is rotated, the planetary gears 19b supported by the bearings 12b provided to the working shaft 12 are turned on its axis, and are received with the working shaft 12 due to meshing with the fixed internal gear 19b. And, the rotating movement is transmitted to the center gear 14b meshed with the planetary gears. Since the center gear 14b is secured to the end of the steering screw, the steering screw 14 is rotated with the center gear 14b. As a result, the steering pipe 16 which has the female screw 16a engaged with the male screw 14a of the steering screw 14 is moved axially, and the rudder means (not shown) is operated through the steering rod 17 connected rotatably with the end of the steering pipe 16.

It is preferable that a stopper 6b is projected axially in the certain regions of the both side surfaces of the operating pulley 6, and that a projection 3a is projected from the casing 3, whereby the axial movement and the rotation of the operating pulley 6 are simultaneously stopped by the under surface 6c of the stopper 6b contacting with the projection 3a. Therefore the excess rotation of the steering wheel 1 can be prevented.

The end portions of the two inner cables inserted into the cable conduits fixed to both units are wound round both pulleys in opposite directions to each other as one end of each cable is wound onto one pulley, the other end is wound off the other pulley by operation of the device. Therefore, the winding positions of the inner cables on both pulleys are shifted properly by the operation. Both pulleys are moved axially with rotation in conformity with the shift of the winding position. Therefore, both the fixed positions of the conduits and the winding positions of the inner cables on both pulleys are always constant. Accordingly, the inner cables do not receive excessive bending force, and the distance bwtween the fixed position of the conduit and the pulley can be shortened. Therefore, the apparatus of the invention can be constructed compactly.

It is preferable that the cable guide 8, 18 covering the suitable regions in both ends of both pulleys are provided, whereby the shifts of both pulleys become easy.

In the steering apparatus of the invention, when the rudder means receives a strong force from waves, the force is transmitted to the steering screw 14 through the steering rod 17 and the steering pipe 16. However, since the steering screw 14 and the steering pipe are constructed so as to transform the rotating motion to sliding motion by screw means, even the impact of the waves is transmitted to the steering screw axially, the torque is not transferred to the over-drive means 19, and does not exert any influence upon the inner cable 9.

Therefore, elongation of the inner cable is generated only by the tension of the inner cable, and therefore the inner cables merely require slight adjustment. In addition, the navigation of the boat employing the apparatus of the invention becomes more stable as compared with the conventional apparatuses.

Also, the apparatus can be constructed compactly, because both pulleys are moved axially and the inner cable does not receive excessive force as described above. As a result, the apparatus of the invention can be attached easily to the conventional rudder means.

Figure 8:
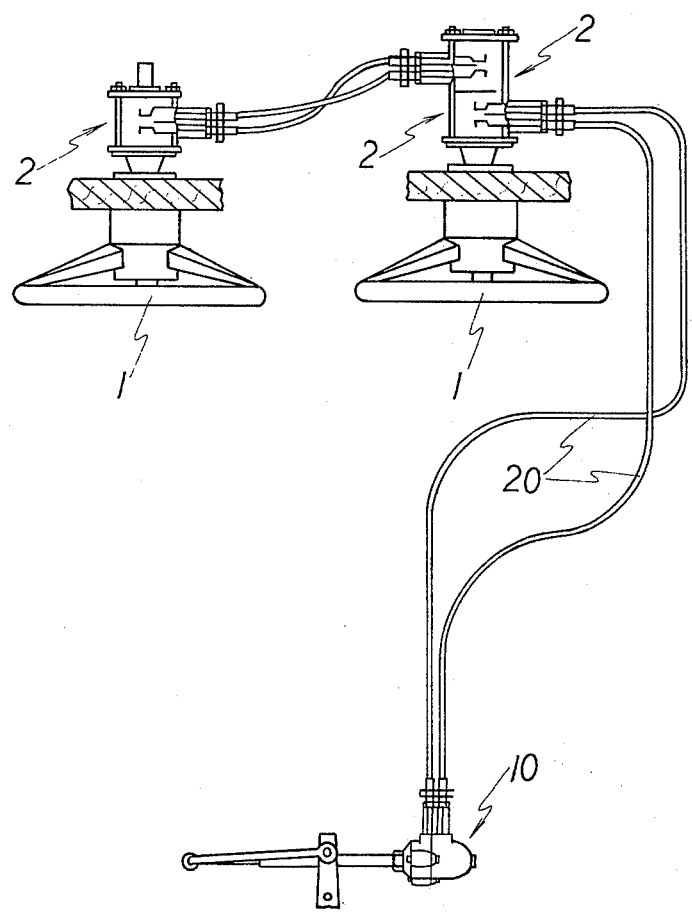

Furthermore, since the apparatus of the invention is separated into two compact units (operating unit and steering unit), and each unit is connected to the other by cable, plural operating units can be combined easily as shown in FIG. 6, and two individual steering units can be operated easily by one steering wheel. Further, the apparatus of the invention can be combined with several forms as shown in FIGS. 7 and 8, in which two or one steering units can be operated by the steering wheel provided at plural positions.

It is preferable that the splines 5a, 6a, 12a and 13a provided on the outer surface of the operating main shaft and in the inner surface of both pulley have suitable lead angle, whereby the axially slidable movement of both pulleys on the shaft becomes more smooth.

What is claimed is:

1. In a steering apparatus comprising an operating unit and a steering unit connected together by two pull control cables to remotely control a rudder means, the improvement wherein
   a. said operating unit comprises an operating-side casing;
   a drive shaft having an outer surface supported in said operating-side casing and rotated by a steering wheel;

an operating main shaft having inner and outer surfaces, said inner surface being arranged on the outer surface of said driving shaft and engaged with said driving shaft;

an operating pulley having inner and outer surfaces, said inner surface being arranged on said outer surface of said operating main shaft and engaged therewith so as to be rotatable therewith and moveable axially thereon, and an engaging hole being perforated in said outer surface of said inner pulley; and an inner cable having first and second ends and having an engaging member fixed to each of said ends, said engaging member fixed to said first end being fixed in said engaging hole;

b. said steering unit comprises a working-side casing;

a steering screw supported in said working-side casing, said steering screw being provided with a male screw having a suitable length on one end portion, and being secured to a center gear on the other end;

a guide pipe covering said male screw so as to provide a gap therebetween, and secured to said working-side casing at one end;

a steering pipe having inner and outer surfaces inverted into the gap between said steering screw and said guide pipe so as to be moveable axially, and having a female screw engagable with said male screw at a certain region of the inner surface of one end thereof, and connected with a steering rod at the other end thereof;

an over-drive means engaging with said center gear;

a working shaft having inner and outer surfaces combined with said over-drive means; and a working pulley having inner and outer surfaces, said inner surface being arranged on the outer surface of said working shaft so as to be moveable axially and engageable with said working shaft, and an engaging hole being perforated on the outer surface of said working pulley to engage with said engaging member fixed to said second end of said inner cable, and c. two conduits connecting said operating unit and said steering unit, a tension-adjusting member being arranged on at least one end thereof, and inner cables inverted into each of said conduits, one end portion of each inner cable being wound round said operating pulley, the other end portion being wound round said working pulley.

2. A steering apparatus of claim 1 wherein said operating pulley and said working pulley are provided with cable guides covering certain regions in both ends of the outer surface of each pulley.

3. A steering apparatus of claim 2 wherein said cable guides in said operating pulley and said working pulley are rotated together with said operating pulley and said working pulley.

4. A steering apparatus of claim 1 wherein said operating pulley is provided with a stopper, and said operating-side casing is provided with a projection so as to control the rotation of said operating pulley within a certain region and thereby limit axial movement.

5. A steering apparatus of claim 1 wherein said overdrive means comprises at least one bearing for a planetary gear, and rotating with said working shaft;

at least one planetary gear supported rotatably to said bearing, and engaging with said center gear, and an internal gear fixed to said working-side casing, and engaging with said planetary gear.

6. A steering apparatus of claim 1 wherein said steering screw is buffed from the shock of waves transmitted through said rudder means by a buffer member provided to bearings of said steering screw.

7. A steering apparatus of claim 1 wherein pulural operating units are connected to each other in the axial direction.

* * * * *